(12) United States Patent  
Cory et al.

(10) Patent No.: US 7,519,747 B1
(45) Date of Patent: Apr. 14, 2009

(54) VARIABLE LATENCY BUFFER AND METHOD OF OPERATION

(75) Inventors: Warren E. Cory, Redwood City, CA (US); Joseph Neil Kryzak, San Jose, CA (US)

(73) Assignee: XILINX, Inc., San Jose, CA (US)

( * ) Notice: Subject to any disclaimer, the term of this patent is extended or adjusted under 35 U.S.C. 154(b) by 1052 days.

(21) Appl. No.: 10/660,449

(22) Filed: Sep. 11, 2003

(51) Int. Cl.
G06F 5/06 (2006.01)
G06F 3/00 (2006.01)
G06F 3/06 (2006.01)

(52) U.S. Cl. ............ 710/53; 710/52; 710/54; 710/57

(58) Field of Classification Search ............ None
See application file for complete search history.

(56) References Cited

U.S. PATENT DOCUMENTS

| | | | |
|---|---|---|---|
| 5,563,891 A * | 10/1996 | Wang | 370/505 |
| 6,721,825 B1 * | 4/2004 | Wood | 710/52 |
| 6,812,870 B1 | 11/2004 | Kryzak et al. | |
| 6,870,390 B1 | 3/2005 | Groen et al. | |
| 6,908,340 B1 | 6/2005 | Shafer | |
| 6,956,442 B2 | 10/2005 | Groen et al. | |
| 6,959,015 B1 * | 10/2005 | Hwang et al. | 370/516 |
| 6,975,132 B2 | 12/2005 | Groen et al. | |
| 6,976,102 B1 | 12/2005 | Groen et al. | |
| 6,995,618 B1 | 2/2006 | Boecker | |
| 7,015,838 B1 | 3/2006 | Groen et al. | |
| 7,047,457 B1 | 5/2006 | Black et al. | |
| 7,073,148 B1 | 7/2006 | Jenkins | |
| 7,092,689 B1 | 8/2006 | Boecker et al. | |
| 7,099,426 B1 * | 8/2006 | Cory et al. | 375/372 |
| 7,109,809 B1 | 9/2006 | Groen et al. | |
| 7,187,709 B1 | 3/2007 | Menon et al. | |
| 7,188,283 B1 | 3/2007 | Shafer et al. | |
| 7,224,951 B1 | 5/2007 | Chuang et al. | |
| 7,280,590 B1 | 10/2007 | Boecker et al. | |
| 7,295,639 B1 | 11/2007 | Cory | |
| 7,313,176 B1 | 12/2007 | Groen | |
| 7,362,864 B2 | 4/2008 | Kryzak et al. | |
| 7,382,823 B1 | 6/2008 | Cory | |

OTHER PUBLICATIONS

U.S. Appl. No. 10/659,803, filed Sep. 11, 2003, Black, William C., et al., Analog Front-End Having Built-In Equalization and Applications Thereof, Xilinx, Inc. 2100 Logic Drive, San Jose, California 95124.
U.S. Appl. No. 10/660,254, filed Sep. 11, 2003, Groen, Eric D., et al., MGT/FPGA Clock Management System, Xilinx, Inc. 2100 Logic Drive, San Jose, California 95124.
U.S. Appl. No. 10/661,016, filed Sep. 11, 2003, Groen, Eric D., et al., Programmable Logic Device Including Programmable Multi-Gigabit Transceivers, Xilinx, Inc. 2100 Logic Drive, San Jose, California 95124.

\* cited by examiner

*Primary Examiner*—Tanh Q Nguyen
(74) *Attorney, Agent, or Firm*—Walter D. Fields; W. Eric Webostad

(57) ABSTRACT

A variable latency elastic buffer comprises a plurality of memory locations in which to hold data. A write and read pointer may point to respective write and read addresses of the plurality of locations in which to write and read data. A controller may hold or increment the address of the read pointer upon determining that the amount of data within the buffer differs from a nominal fill level. In a particular embodiment, initialization circuitry may be operable to initialize the read and write addresses of the respective pointers responsive to an initialization request. The read and write addresses may differ from one another by an offset value equal to a value programmed for the nominal value.

5 Claims, 11 Drawing Sheets

VARIABLE LATENCY BUFFER AND METHOD OF OPERATION

RELATED APPLICATIONS

This application is related to co-pending U.S. patent application Ser. Nos. 10/082,490, 10/090,250, and 10/234,978, each commonly owned by the assignee of the present application and incorporated herein by reference in its entirety.

FIELD OF THE INVENTION

The present disclosure relates to data communication and more particularly to buffer circuits and their methods of operation.

BACKGROUND

As communication technologies evolve, data transfer speeds increase along with the amounts of data. These parameters continually push the demands of the data processing devices to provide for circuits that may handle more data with faster throughput.

At the same time, the semiconductor industry has been developing integrated circuits of greater density and smaller size. With these increased levels of integration and functionality within the smaller area devices, a greater premium exists on the availability of signal interfacing.

To assist these I/O needs, transceiver-multiplexing circuits may be used to replace parallel data lines with higher speed serial interfacing. Using a transceiver-multiplexing circuit, a receiver may receive a high-speed serial data sequence and then convert it into parallel data of a slower clock rate. Likewise, data that is to be sent out may be converted from a parallel format to a serial data stream.

To further enhance the data handling capability, the serial-to-parallel and parallel-to-serial transceivers may be disposed in parallel relationships on a given data-handling device. This structure may enhance the efficiency of the more highly integrated data processing applications of, e.g., encoded data processors or programmable circuits of a field programmable gate array (FPGA).

When receiving data of an external serial data stream, the transceivers may accommodate input data transfer speeds as high as 3-10 gigabits per second, or even higher. This speed of operation, in some instances, may be much greater than the internal operating speed of an embedded data processor/system. But use of the serial-to-parallel transceivers and conversion of the serial data into parallel data may effectively reduce the high-speed data rate of the serial stream to a slower rate.

For example, a serial data stream may be encoded with, e.g., "non-return to zero" encoding of a known protocol to assist clock recovery processes. It may arrive with a 3 gigabit per second (Gbs) data rate. Assuming an 8 bit/10 bit (non-return to zero) structure, a decode and clock recovery process may replace every 10 bits of the input stream with 8 bit recovered data and may establish a corresponding clock rate of about 2.4 Gbs. Subsequent serial-to-parallel conversion to 16 bits of parallel data may further reduce the effective data/clock rate from 2.4 Gbs to about 150 megabits per second. This lower data rate may be more easily accommodated by most off-the-shelf and/or "library" data processing circuits, systems and embedded components.

From the above example, the effective I/O pad count for an integrated circuit may be reduced by a factor of 16-to-1, or more commonly 8-to-1 when the serial data is a differential signal. That is, the pin count for the integrated circuit may be reduced proportionately in accordance with the conversion factor of the transceiver.

When working with fast input data streams, some communication systems may recover an input clock from transitions of the received input data (rather than accompany the data signal with an associated clock signal). Using known data encoding protocols, the data to be delivered may be encoded to assure a sufficient number of signal transitions that may support clock recovery. For example, eight bits of data may be encoded into a 10 bit sequence. The encoding may add additional transitions to facilitate AC-coupling and clock recovery. Thus, for example, a hexadecimal data "FF" (1111 1111), which might otherwise present eight consecutive high level conditions for serial propagation, may be alternatively encoded to a 10-bit sequence with additional zero states (101011 0001). The encoded 10-bit serial data stream encoded by such known encoding protocols may also help guarantee a DC-balance, which may be helpful when using AC coupling.

It may be further noted that the different data channels may present data to a receiver with different timing relationships. In other words, the data of one channel may be offset or "skewed" relative to the data of the other channels. Additionally, the frequency from which the data originated may not be coherently related to the internal operating frequency of the receiver. In other words, the data may originate from a transmitter having a clock frequency that may be different from that of the receiver and that may also drift over time.

Because the data of the separate parallel communication channels may not be aligned relative to each other at the receiver, and because the frequency associated with the received data may not be coherent to the internal operating frequency of the receiver; buffers may be required to buffer and align the data of the different channels. Additionally, the buffers may correlate the data that is recovered to an internal operating frequency of the receiver.

SUMMARY

In accordance with an embodiment of the present invention, a variable latency elastic buffer may comprise a plurality of memory locations to hold data. A write pointer is operable to point a write address of the plurality of memory locations in which to write input data. A read pointer may point a read address of the plurality of memory locations from which data may be read. The read and the write pointers respond to respective read and write clocks for incrementing their addresses across the address space of the plurality of memory locations. A control register may receive a nominal fill value to define the nominal amount of data to be held in the buffer. A controller may adjust the address of the read pointer responsive to a determination that the amount of data in the buffer differs from the nominal fill value presented by the control register.

In accordance with a further embodiment, the controller may temporarily hold or decrement the read address of the read pointer when determining an amount of data in the buffer less than the nominal value. Alternatively, the controller may advance the read address of the read pointer upon determining the amount of data to be greater than the nominal value.

In accordance with a further embodiment, the controller may first determine if the amount of data differs from the nominal amount by at least a predetermined threshold before enabling the hold or advancement of the read address.

In accordance with another embodiment of the present invention, a channel alignment circuit may comprise a plurality of buffers to buffer and synchronize data of a plurality of data channels. Correction logic may pad or omit data from at least one of the buffers upon determining the amount of data therein to differ from a threshold value of a control register. In a further embodiment, a variable latency register may receive and present a nominal fill value for use as the control value of the control register. A comparator may then determine whether the magnitude of the difference between the amount of data in the buffer and the nominal fill value is sufficient to enable padding or omission of data for clock correction.

In a further embodiment, a generator may generate a threshold value based on the nominal fill value. Clock correction may then be triggered when the amount of data in the buffer differs from the nominal fill level by an amount greater than the threshold.

In accordance with a further embodiment, the variable latency register may be defined at least in part by one of the group consisting of a read-write memory, a content addressable memory, a look up table, a programmable fabric and an increment decrement register.

In accordance with a further embodiment, initialization circuitry may initialize the beginning read and write addresses of the respective pointers. The pointers may be initialized with an offset therebetween that is based upon the nominal fill level.

In yet another embodiment, a parameter for the packet length of data to be processed by the buffer may be determined and used to define the value for the nominal fill. In another embodiment, the value for the nominal fill may be defined dependent upon at least one of an identified protocol, a maximum skew between data blocks of two separate channels, and a difference between read and write frequencies.

DETAILED DESCRIPTION

In the following description, numerous specific details may be set forth to provide an understanding of exemplary embodiments of the present invention. It will be understood, however, that alternative embodiments may comprise subcombinations of the disclosed examples.

Additionally, readily established circuits and procedures of the exemplary embodiments may be disclosed in simplified form (e.g., simplified block diagrams and/or simplified description) to avoid obscuring an understanding of the embodiments with excess detail. Likewise, to aid a clear and precise disclosure, description of known processes—e.g., triggering, clocking, state-machine, programming procedures—may similarly be simplified where persons of ordinary skill in this art can readily understand their structure and operations by way of the drawings and disclosure.

Figure 1:
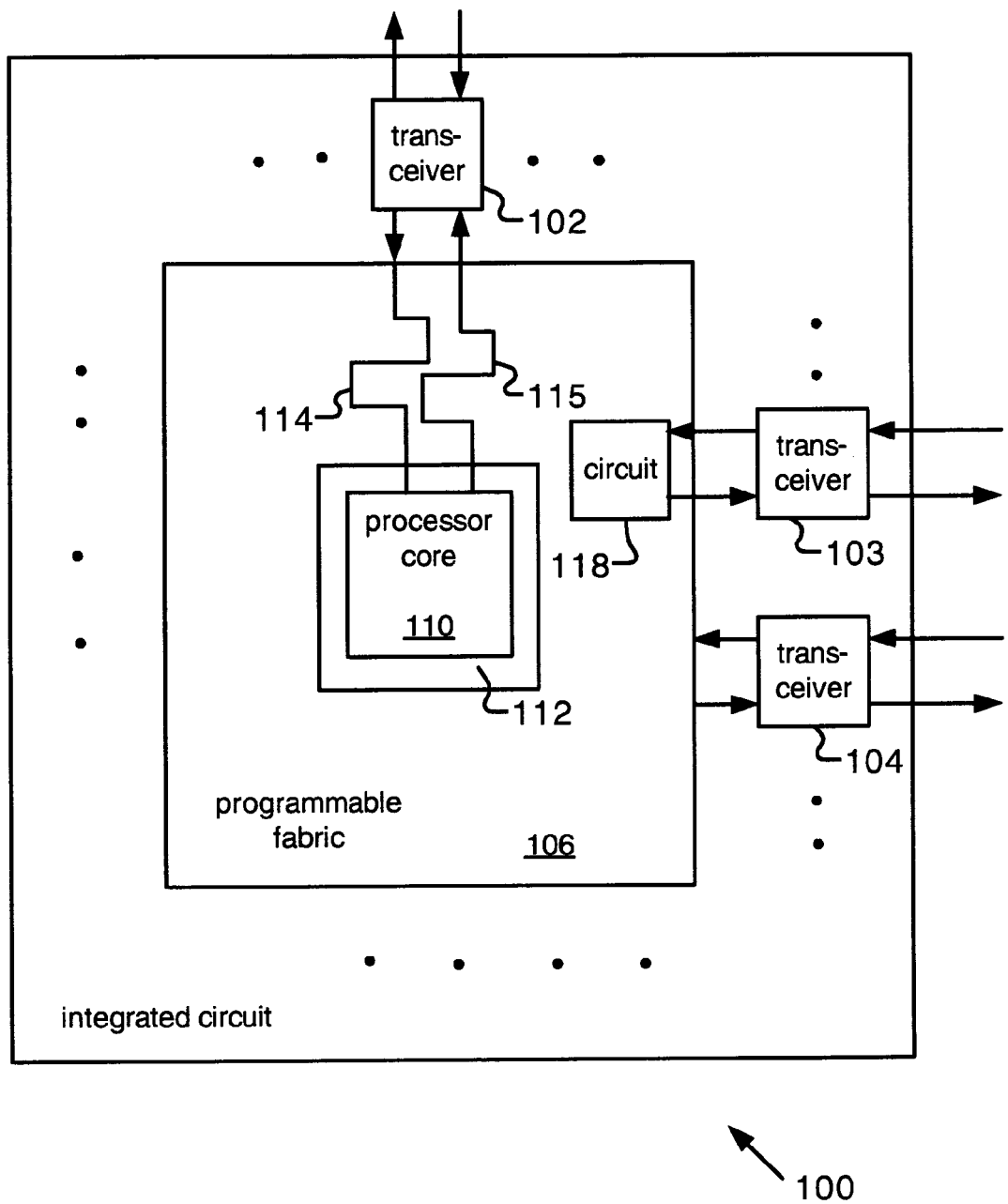
FIG. 1 shows a simplified block diagram of a data handling system in accordance with an embodiment of the present invention.

Referencing FIG. 1, an integrated system may comprise a plurality of transceivers such as transceivers 102-104, positioned to interface with embedded programmable fabric 106. In one embodiment, programmable fabric 106 may comprise a field programmable gate array (FPGA) fabric. One or more processor cores, such as processor core 110, can be optionally embedded inside programmable fabric 106. An interface layer 112 may facilitate communication between embedded processor core 110 and fabric 106. In certain embodiments, processor core 110 may be connected to one or more transceivers.

For example, further referencing FIG. 1, a pair of paths 114-115 may interface transceiver 102 to processor core 110 through interface layer 112. In certain embodiments, processor core 110 may comprise one of a variety of signal processing devices, such as a microprocessor, network processor, or video processor. In further embodiments, more than one processor core may be embedded inside programmable fabric 106.

A user may configure a plurality of circuits in programmable fabric 106. Some of these circuits may also communicate with transceivers 102-104. For example, further referencing FIG. 1, a circuit 118 of programmable fabric 106 may be coupled to communicate with transceiver 103. In particular embodiments of the present invention, at least one of the transceivers (in addition to programmable fabric 106) may be configurable.

Figure 2:
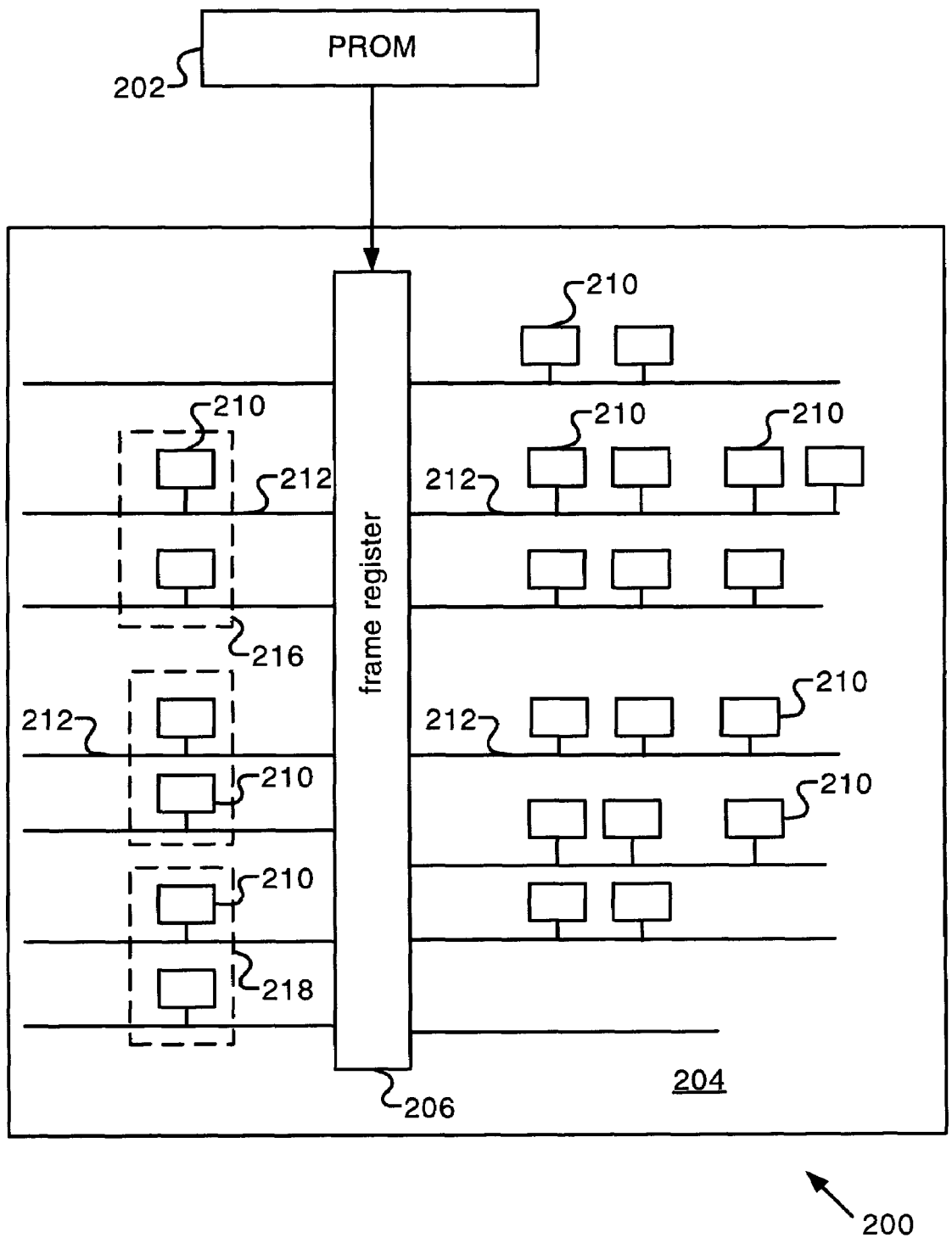
FIG. 2 shows a schematic diagram of a system for configuring a data handling system.

Referencing FIG. 2, system 200 may comprise a configurable programmable logic device such as FPGA 204. System 200 may also comprise a nonvolatile memory (such as a programmable read-only memory 202) that can be used to deliver configuration data to FPGA 204. FPGA 204 may comprise a plurality of configuration memory cells 210 that are connected to a frame register 206 through a plurality of buses 212. Buses 212 allow frame register 206 to set the states of memory cells 210 to configure FPGA 204.

Some of the configuration memory cells may be used to configure programmable fabric 106, while other configuration memory cells may be used to configure the transceivers (e.g., 102-104). For example, configurations memory cells in blocks 216 and 218 may be used to configure two separate transceivers, such as transceivers 103 and 104 in FIG. 1. For certain embodiments, there may be many configuration memory cells associated with a block.

Some memory cells may define logic block functions and a variety of interconnections to implement desired logic designs in programmable fabric. Other memory cells, in exemplary embodiments of the present invention, may be used for purposes of programming performance of the transceiver. Some of the memory cells associated with the transceiver may further be used to modify routing of data in the transceiver, thereby including or excluding a sub-component of the transceiver to work with the data.

In a particular embodiment, a portion of the transceiver may be configured via data of the configuration memory cells and another portion may be configured via control values established by logic in the programmable fabric. In an alternative embodiment, the transceiver may be controlled entirely by the configuration memory cells. Likewise, in further embodiments, it may be controlled entirely via the configured logic.

Figure 3:
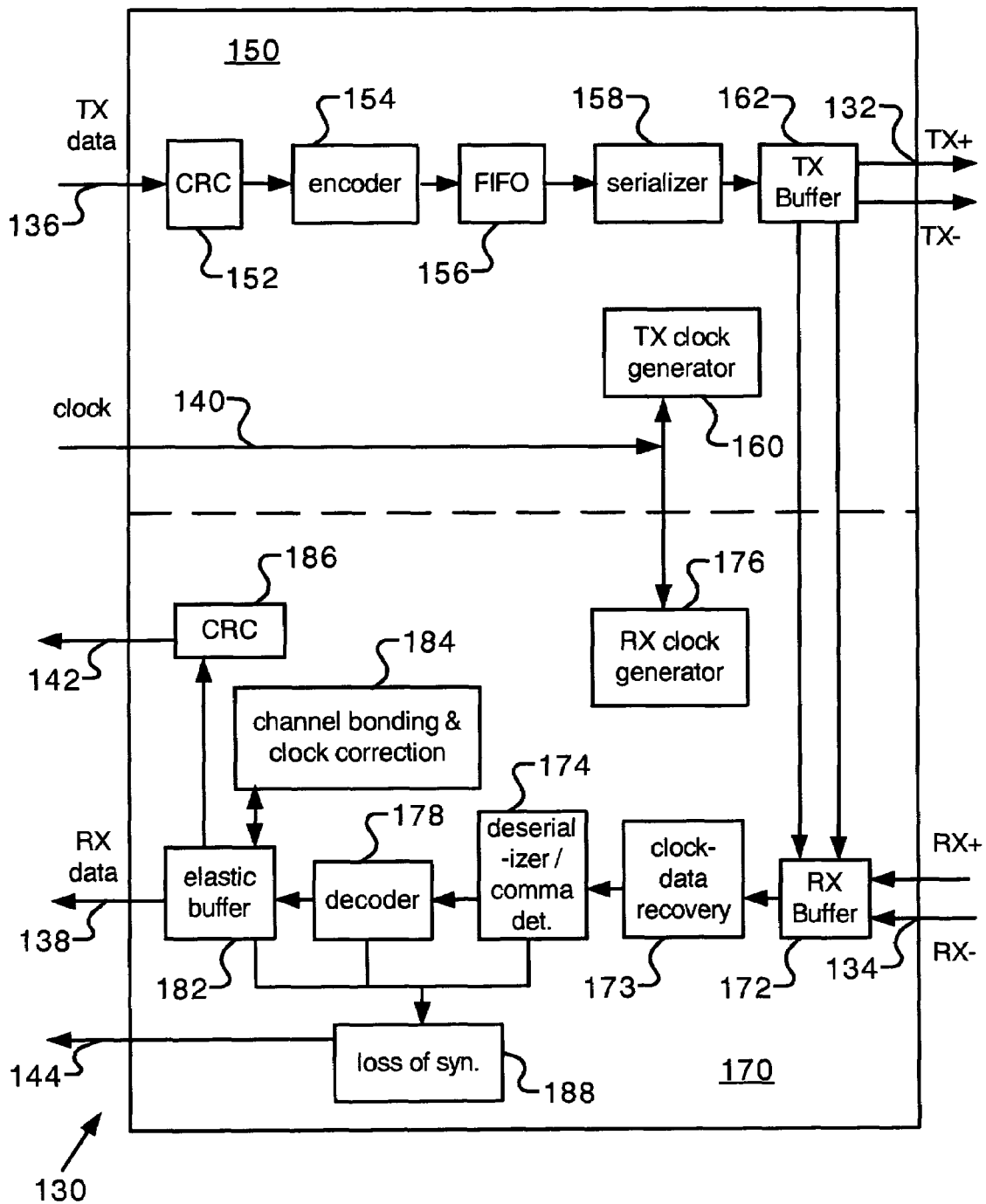
FIG. 3 is a simplified block diagram showing a transceiver device incorporating a variable latency elastic buffer in accordance with an embodiment of the present invention.

Referencing FIG. 3, one example of transceiver 130 for interfacing a data processing system (not shown), may comprise ports 132 and 134 to communicate with an external device (not shown). Port 132 may interface differential output signals and input port 134 may receive differential input signals. Transceiver 130 may handle data to/from internal circuits of an integrated system or data processor via the respective transmit and receive data ports 136 and 138.

A plurality of clock signals (shown collectively along signal line 140) may support clocking of data at transmit buffer 162 and receive buffer 172. Transceiver 130 may further comprise cyclic redundancy code (CRC) circuitry 186 of known provisions for operating a CRC status signal 142. Additionally, synchronization status circuitry 188 may be operable to provide synchronization signal 144 dependent on whether or not synchronization has been established or lost.

In one embodiment, the width of the data paths 136 and 138 may be independently configurable and selected to be 1, 2, or 4 bytes. In other embodiments, the data paths 136 and 138 may have other widths.

Addressing the transmitter side 150 of transceiver 130, data of data path 136 may be selectably (or optionally) processed by a CRC generator 152. This CRC generator may compute and insert known CRC, such as a 32-bit CRC, into data packets for transmission. Because different protocols may handle data in different ways, CRC generator 152 may recognize data packet boundaries by which to perform CRC computation for appropriate sets of data.

The resultant CRC data may then be delivered to encoder 154. In one embodiment, encoder 154 may comprise a known 8B/10B encoder. For example, it may use the 8B/10B code having 256 data characters and 12 control characters that is used in the Gigabit Ethernet, XAUI, Fibre Channel, and InfiniBand protocols. The encoder may accept 8 bits of data along with a K-character signal for a total of 9 bits per character applied. If the K-character signal is "High", the data will be encoded into one of the 12 possible K-characters available in the 8B/10B code. If the K-character input is "Low", the 8 bits will be encoded as standard data. If the K-character input is "High", and a user applies other than one of the pre-assigned combinations, an error signal can be generated.

The encoded data may then be delivered to a transmit FIFO buffer 156. This buffer may interface encoder 154 to serializer 158. The encoder 154 may be controlled by a clock of the internal system on line 140. The serializer may be controlled by a reference clock generated by a transmit clock generator 160. These two clock signals may be frequency locked. Although frequency locked, the two clock signals may have different relative phase relationships. Accordingly, transmit FIFO buffer 156 may be operable to absorb phase differences between the two frequency-locked clock signals.

The data of FIFO buffer 156 may be delivered to serializer 158, which may multiplex the parallel digital data of FIFO 156 into a serial bit stream for transmission over a serial link. The serial bit stream may be output by transmit buffer 162, which may drive the serial bit stream onto a pair of differential lines of output port 132.

Turning now to the receiver side 170, transceiver 130 may further comprise a receiver clock generator 176 that may generate a reference clock signal to operate certain parts of the receiver. Receive buffer 172 may accept and buffer the serial data received from differential lines of input port 134. The buffered data signal may then be fed to a clock-data recovery block 173, which may recover a clock signal from transitions of the serial input signal. The clock recovered may comprise a frequency and phase based on that of the incoming serial data. This recovered clock may then be used to time the reception of the data within the deserializer 174, decoder 178 and elastic buffer 182.

Deserializer 174 may convert data of a serial bit format into parallel digital data. In a further embodiment, deserializer 174 may also perform comma detection. In some decoding algorithms, (such as the 8B/10B encoding), a "comma" may be used as a distinguishable pattern by which to assure determination of the byte boundaries within the serial data stream. For example, two comma patterns on known 8B/10B decoding may comprise a comma "plus" and a comma "minus". Detection of a comma may then define the byte alignments within the received serial bit stream. In one embodiment, programmable cells may establish control signals to control whether the comma detection circuit is to realign the byte boundaries on comma plus, comma minus, both, or neither.

In exemplary operation, decoder 178 may decode digital data that has been previously encoded. When enabled, it may decode and, in accordance with its selected configuration, raise a synchronous "comma" flag (as a status bit to be attached to each received byte at the transceiver's programmable fabric interface) on comma plus only, comma minus only, both, or neither. In further embodiments, it may set this flag for valid commas only.

Upon leaving decoder 178, the decoded data may be sent to an elastic buffer 182. Elastic buffer may perform channel bonding and clock correction as driven by clock correction controller 184. Elastic buffer 182 may be configurable for various configuration options such as:
 (a) use or bypass;
 (b) enablement of clock correction; and
 (c) levels to signal overflow or underflow conditions.

Configuration options might also include choice of channel bonding modes, the selection of a selectable number of channel bonding sequences, establishing a selectable length for matching a selectable byte value (8-bit or 10 bit), and similar provisions for clock correction sequences.

After re-synchronization by the elastic buffer, the data may then be delivered to an internal system, such as the programmable fabric, across data path 138. In one embodiment, the data width of data path 138 may be configurably selected to be 1, 2, or 4 bytes.

In further embodiments of the transceiver, elastic buffer 182 may be optionally connected to a known CRC verification block 186. This block may, for example, verify that the commonly used 32-bit cyclic redundant code (CRC) appears at the end of the received data packets. A signal may then be delivered to the internal system on line 142 to indicate the CRC verification.

Transceiver 130 may further comprise a loss of synchronization detector 188. It may interpret outputs of comma detector 174, decoder 178, and elastic buffer 182 to determine whether the incoming bytes of the data stream are in synchronization. A signal may then be delivered to the programmable fabric on line 144 to report the synchronization status.

Referring back to FIG. 2, in accordance with one embodiment, the configuration information for the configurable transceivers may be stored in programmable read-only memory "PROM" 202. A user may then select different options by delivering predetermined configuration data to FPGA 204.

Figure 4A:
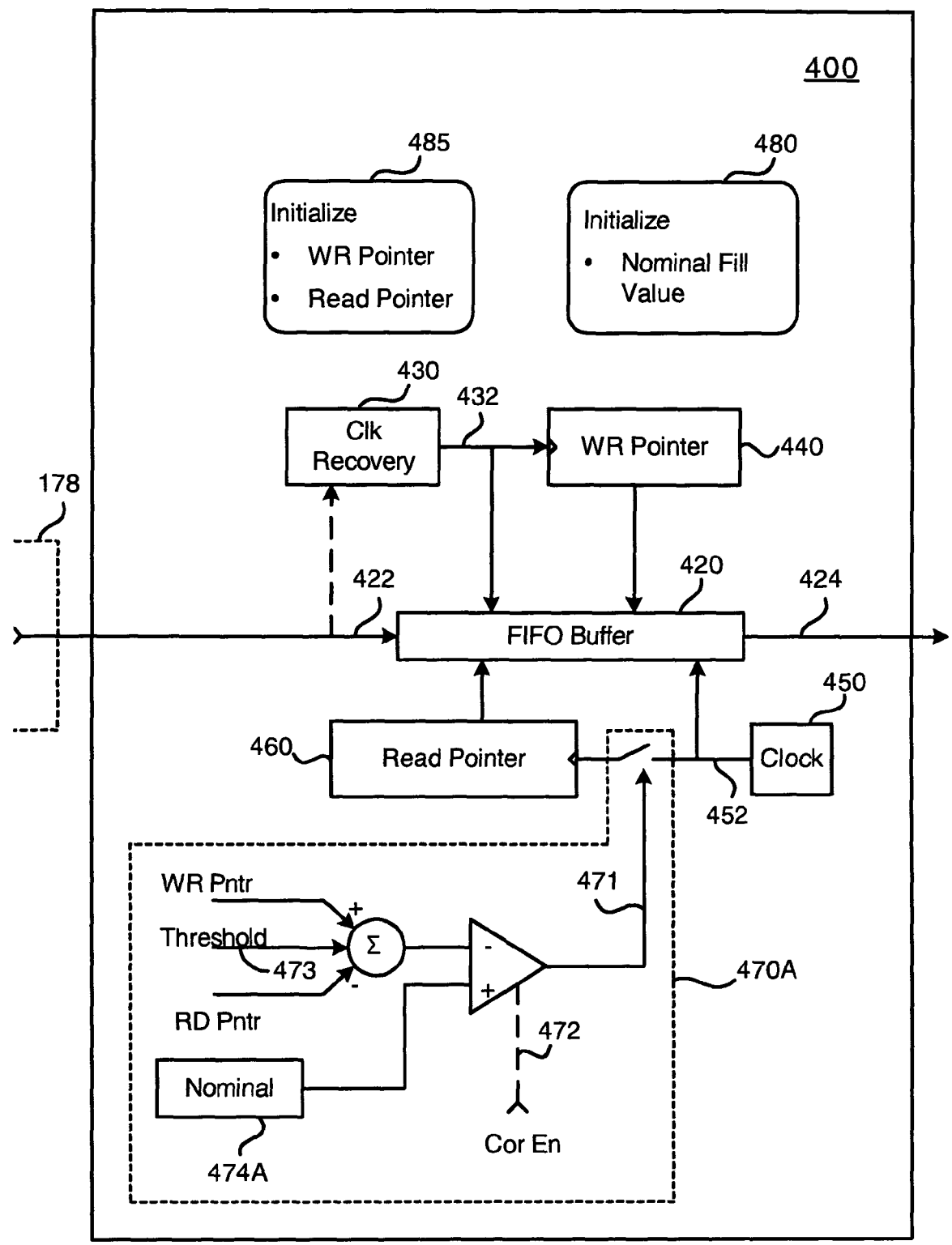
FIGS. 4A and 4B show simplified schematic diagrams of elastic buffers in accordance with exemplary embodiments of the present invention.
Figure 4B:
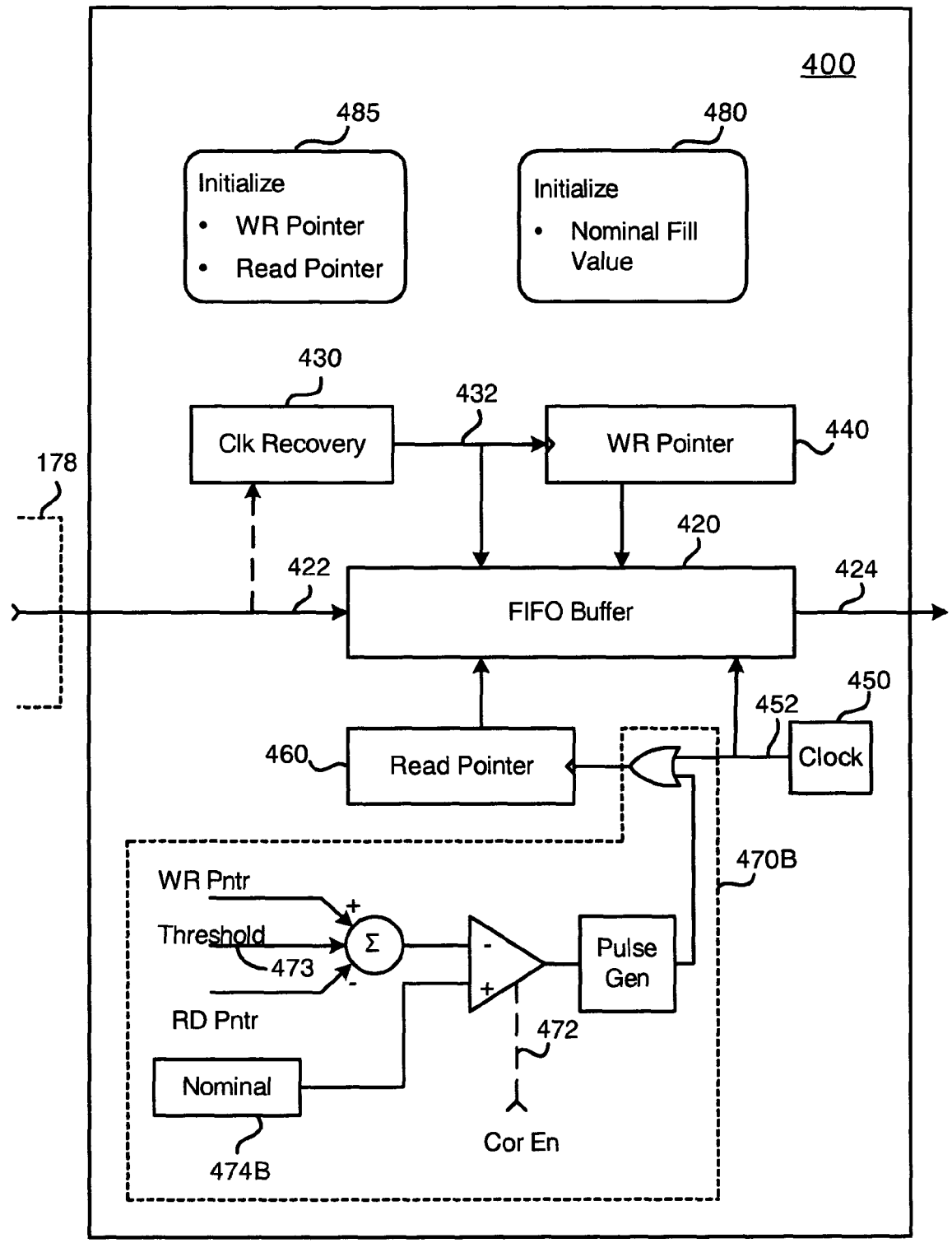

Referencing FIG. 4A, in accordance with an embodiment of the present invention, elastic buffer 400 may comprise an array 420 of memory locations separately addressable across an address space. For example, the array 420 may comprise 64 different locations addressable by respective addresses, e.g., A00, A01 . . . A63. Each location of the memory array may hold a block of data, such as a byte of data. Note that while certain blocks, such as clocking blocks 430 and 450, are shown in FIGS. 4A and 4B as part of elastic buffer 400, these blocks may be shared with other parts of the system, such as other portions of the transceiver. Consequently, in various embodiments some or all of these blocks may be implemented wholly or partially in other parts of the system.

The array of memory locations may be driven and operable as a FIFO (First In First Out) buffer. In this mode, the last addressable memory location (e.g. A63) may be treated as addressable in contiguous relationship with the buffer's first memory location (A00). When receiving data, input data received, e.g., on input line 422 may be written into a location of the array as specified by the write address of write pointer 440. The write operation may be in synchronous relationship with respect to a transition of a recovered write clock, e.g. of clock generator 430. When the recovered write-clock signal on clock line 432 transitions, a data block may be written into a memory location as specified by the write pointer 440. Write pointer 440 may likewise increment its address. Responsive to the next transition of the write clock, the next consecutive data block from input line 422 may be written into the next contiguous memory location of the buffer. Upon writing data into the last addressable location, the next data block may be written into the first addressable memory location.

When sending data out from FIFO buffer 420, a transition of a read clock signal (on line 452 of generator 450) may trigger the output of data from a location of the buffer as addressed by read pointer 460. The transitions of read clock 450 may further increment the read address of the read pointer to the next consecutive address of the buffer. Again, upon reaching the last address, the read pointer may wrap back to the first address of the buffer.

Typically, the write address of the write pointer may lead the read address of the read pointer by an offset equal to, e.g., half the size of the buffer. For example, if the buffer comprises 64 addressable memory locations, a write address of 52 would establish a read address of 20 (=52−64/2).

In operation, the elastic buffer may absorb mismatches between the write and read clocks 430 and 450 respectively. In other words, data may be clocked into the FIFO buffer 420 by a write clock 430 of a frequency different from that of the read clock 450 used to output the data. To accommodate the difference between the clocks, elastic buffer 400 may adjust the data output in order to avoid buffer under/overflows. For example, if read clock 450 is faster than the recovered write clock 430, then FIFO buffer 420 may be emptying. To avoid emptying of the FIFO buffer, data of a particular block (e.g., a single byte or a sequence of two or four bytes) may be output multiple times. For instance, the read pointer may be driven so as to hold or decrement its value for at least one clocking transition of the read clock. As a result, the output data may be padded with redundant data and the buffer may restore or replenish its fill level.

Conversely, if the read clock 450 is slower than the recovered write clock 430, then the FIFO buffer may be seen to fill. To avoid overflow, the address of the read pointer may be advanced, which in turn may omit data of the buffer for output. By performing such padding/omission of data, the buffer may be described as "elastic" in keeping a fill level of the memory at a given level with "clock corrections" so as to avoid emptying or overflow.

As used herein, the padding/omission of data may be referenced more generally as "clock correction" or "rate matching". By such clock correction, a data block of an original input stream may be omitted, or a data block added. In this embodiment, the data byte may comprise a single byte or a sequence of bytes (e.g., of two or four bytes). Additionally, the data adjustment may be aligned with a region of the data stream where the loss or addition of data might be of nominal affect. For example, the correction may be timed to coincide with an identified idle or gap sequence between data packets.

Further referencing FIG. 4A, correction control circuitry 470A may monitor the difference between the write address of the write pointer and the read address of the read pointer. If the difference should be less than the nominal fill level, then the control circuitry may recognize that the buffer is emptying and may signal the read pointer to hold, or alternatively decrement, the read address. By such control, the output signal may be padded with redundant data, such as a given data sequence.

In a particular embodiment, the control circuitry may be viewed as disabling the clock signal from read clock 450 as presented to read pointer 460 so as to hold the read address. Accordingly, the output signal may receive redundant data that may correspond to a previous block or sequence output.

In a further embodiment, known protocol or sequence detection circuits (not shown) may detect a given sequence or gap between data packets. It may then generate a correction enable signal to drive enable line 472 of the read pointer control circuitry 470A. Activation of the enable line 472 may be operable to enable adjustment of the address of the read pointer coincident with a given sequence of the received data.

In the exemplary embodiment schematically illustrated in FIG. 4A, the read pointer control circuitry 470A is shown in functional block diagram form. For example, the illustrated schematic shows a summation stage, differential amplifier, and a control line to drive a switch in series with the clock input to the read pointer 460. It will be understood that these illustrated elements may be merely representative of the type of operation to be performed. It should be further understood that alternative implementations may be formed with known digital logic and circuitry for determining a difference value between the read pointer and the write pointer. Additionally, known logic may compare the resultant digital value relative to the nominal value, which may be retrieved from a control register. Further logic circuitry may then determine when the value of the minimum fill may exceed the difference between the read pointer and the write pointer. Upon making such a determination, the determination circuitry may send out control signal 471 to drive, e.g., a first input terminal of an AND gate (not shown specifically) at the read pointer's clock input. A second input terminal of the AND gate might then be coupled to receive the clock signal from read clock 450. In an optional embodiment, a correction enable signal of control enable line 472 may also be available to control operation, and logic may be used to incorporate the control signal per a logical expression, such as (signal_452 AND NOT (signal_471 AND correction_enable_signal_472)).

In yet another embodiment, a flip-flop of the read pointer may have a clock enable input that may be driven dependent on the comparison. In a further embodiment, the logic circuitry of the read pointer may decrement the read address by a magnitude of one or by another decrement amount.

Referencing FIG. 7, read pointer control circuitry may comprise logic circuits 710, 712, 714, 716 and 774 operable to hold or decrement the read pointer address when the fill level of the FIFO buffer drops below the minimum fill level. In a particular embodiment, summing device 714 may determine the difference between the write pointer address and the read pointer address. Comparator 712 may compare the difference to a minimum fill level of control register 774. When enabled by correction enable signal of enable line 472, the comparator may drive multiplexer 710 to make a selection dependent on the comparator's results. When FIFO buffer's fill is less than the minimum level established by register 774, comparator may send a high level signal to multiplexer 710 for selecting its first input 706 for presenting, e.g., zero or negative one at its output. Alternatively, if comparator 712 determines the buffer's fill to be greater than the minimum fill level, then it may send a low level signal to multiplexer 710 for selecting its alternative input 708, e.g., of value one.

Adder 716 may receive the selected value from multiplexer output 711 and may add this to the existing value 718 of the read pointer. Adder 716 may then present its output 720 to the read pointer as the next read pointer address—RD PNTR$_{(N+1)}$. The new address may be captured by the read pointer 460' responsive to the next clock event of read clock 450.

Figure 8:
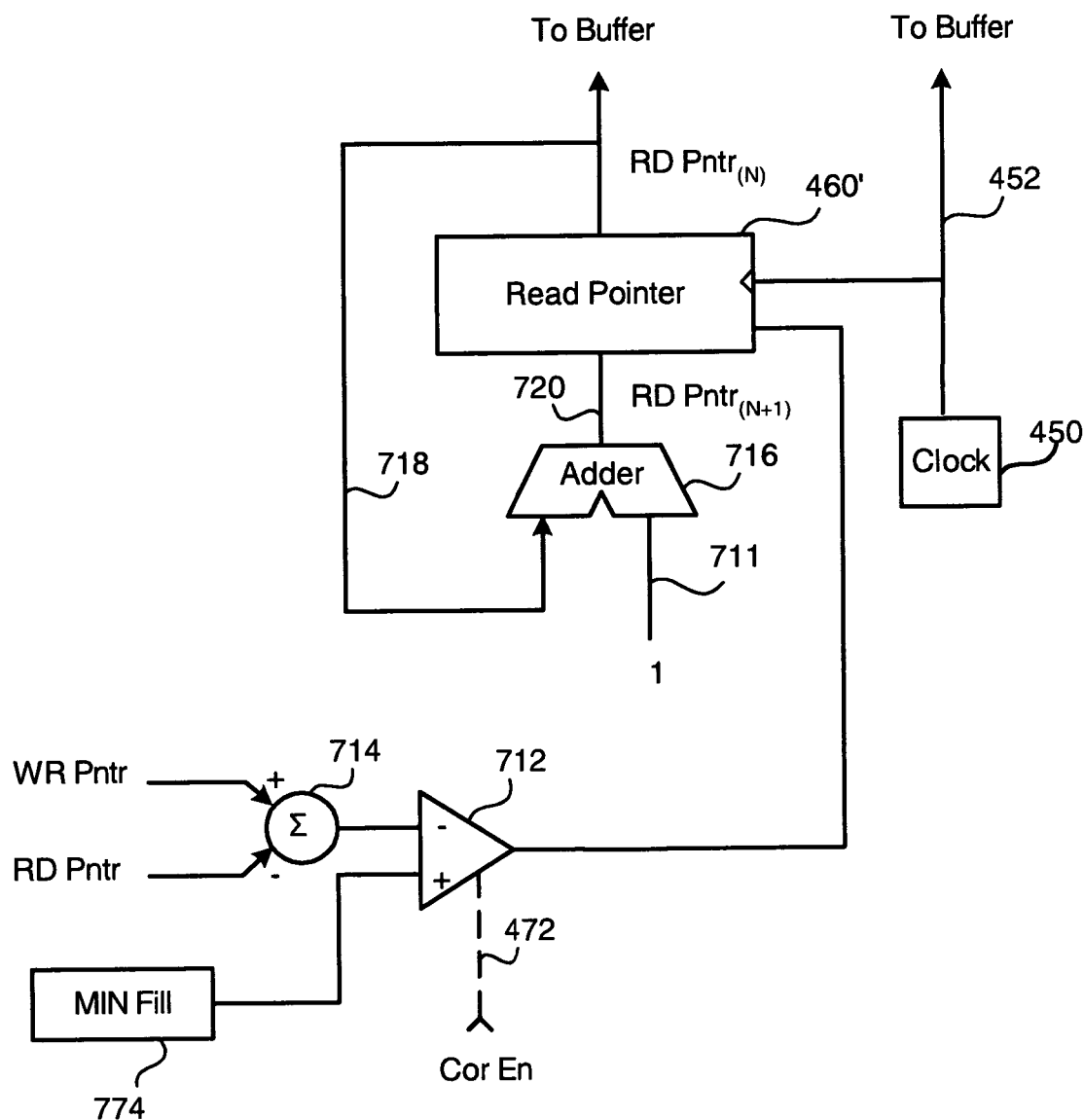
FIG. 8 is a schematic diagram showing circuitry to control the read pointer for an elastic buffer in accordance with another embodiment of the present invention.

In an alternative embodiment, referencing FIG. 8, comparator 712 may be operable to enable/disable the read pointer. When the fill in the buffer is less than the minimum level established by control register 774, the comparator may disable the clock input of the read pointer 460'. When disabled, it will hold its present address. When the fill of the FIFO buffer is restored to a level greater the minimum fill, the comparator may re-enable the read pointer to receive from increment circuitry 716 values to increment its address with each clock event.

In yet a further embodiment, this functionality of the read pointer control circuitry might be implemented in known fashion by a state-machine and/or a microprocessor programmed for performing these functionally illustrated operations.

Turning back with reference to FIG. 4B, an alternative operative mode of read pointer control circuitry 470B may be illustrated schematically to compare the difference between the read pointer and the write pointer relative the nominal fill level for determining when the difference exceeds the nominal level. Upon determining that this difference is greater than the nominal value, the control circuitry may provide extra increments for the read address. As functionally represented by FIG. 4B, the clock input of read pointer 460 may receive extra clocking events to increment the read address multiple times within a normal cycle of the read clock 450. For example, the output of the comparator may drive a pulse generator, which may be responsive to the comparator for generating a pulse. An OR gate may forward pulses from the pulse generator to the clock input of the read pointer. The pulses provided by the pulse generator may increment the value of the read pointer. A correction enable signal on enable line 472 may synchronize operation of the pulse generator in predetermined phase-relationship to clock 450. Accordingly, pulses from the pulse generator may be triggered and output during non-active intervals of the clock signal.

In further embodiments, logic of the read pointer may be configured so as to enable an increment of two or four or other amounts when enabled and upon receiving a clocking event of read clock 450.

Figure 9:
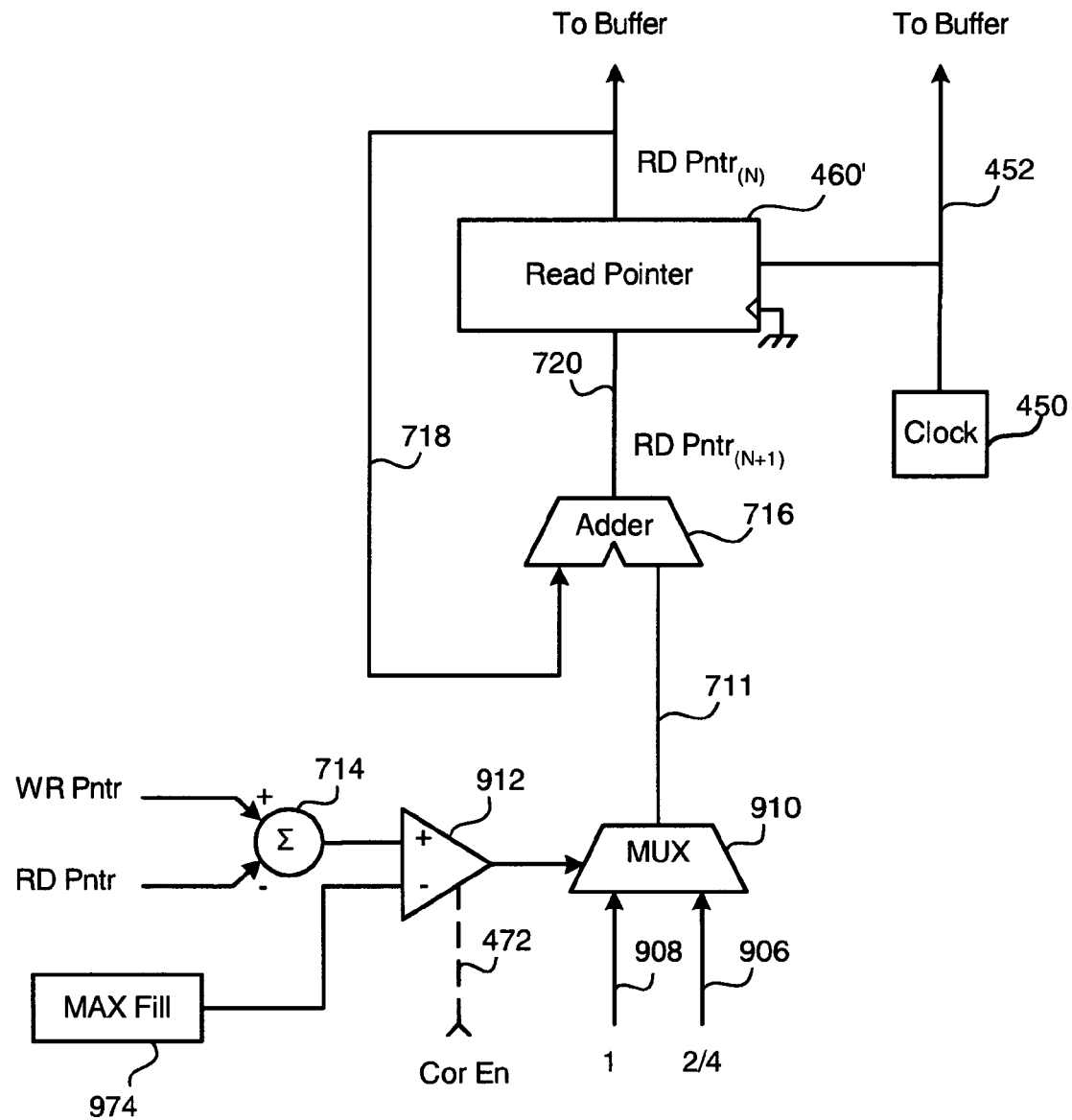
FIG. 9 is a schematic diagram showing circuitry to control the read pointer for an elastic buffer in accordance with a further embodiment of the present invention.

In a particular embodiment, referencing FIG. 9, the read pointer control circuitry comprises alternative logic circuitry 910, 912, 714, 716, and 974 operable to increment the read pointer for performing clock correction when the fill level of the FIFO buffer should exceed the maximum fill level. Comparator 912, when enabled by correction enable signal of enable line 472, may drive multiplexer 910 to make a selection dependent on the FIFO fill level and the control value of control register 974. When the FIFO buffer's fill is greater than the maximum level established by register 974, comparator may send a high level to multiplexer 910 for selecting its first input 906 for presenting a value of, e.g., two or four at its output. Alternatively, when the buffer's fill is less than the maximum fill level, then the comparator may drive multiplexer 910 for selecting its alternate input 908, e.g., of value one.

Again, similarly as described above with reference to FIG. 4A, an alternative embodiment may include provisions to synchronize the clock correction (address advancement) with a known sequence or gap between data packets. This is represented schematically by enable line 472 which may be driven when a predefined sequence or gap has been detected. Accordingly, upon determining that the FIFO buffer 420 may be filling and at a level beyond the nominal control level of nominal control register 474B, the read pointer control circuitry 470B may enable advancement of read pointer 460 in time (e.g., synchronization) with a determined sequence or gap event. By advancing the read pointer, a data block of FIFO buffer 420 may be omitted from output and, if this data omission is synchronized with the sequence or gap event, then the data adjustment may be harmless to the overall functionality.

Figure 7:
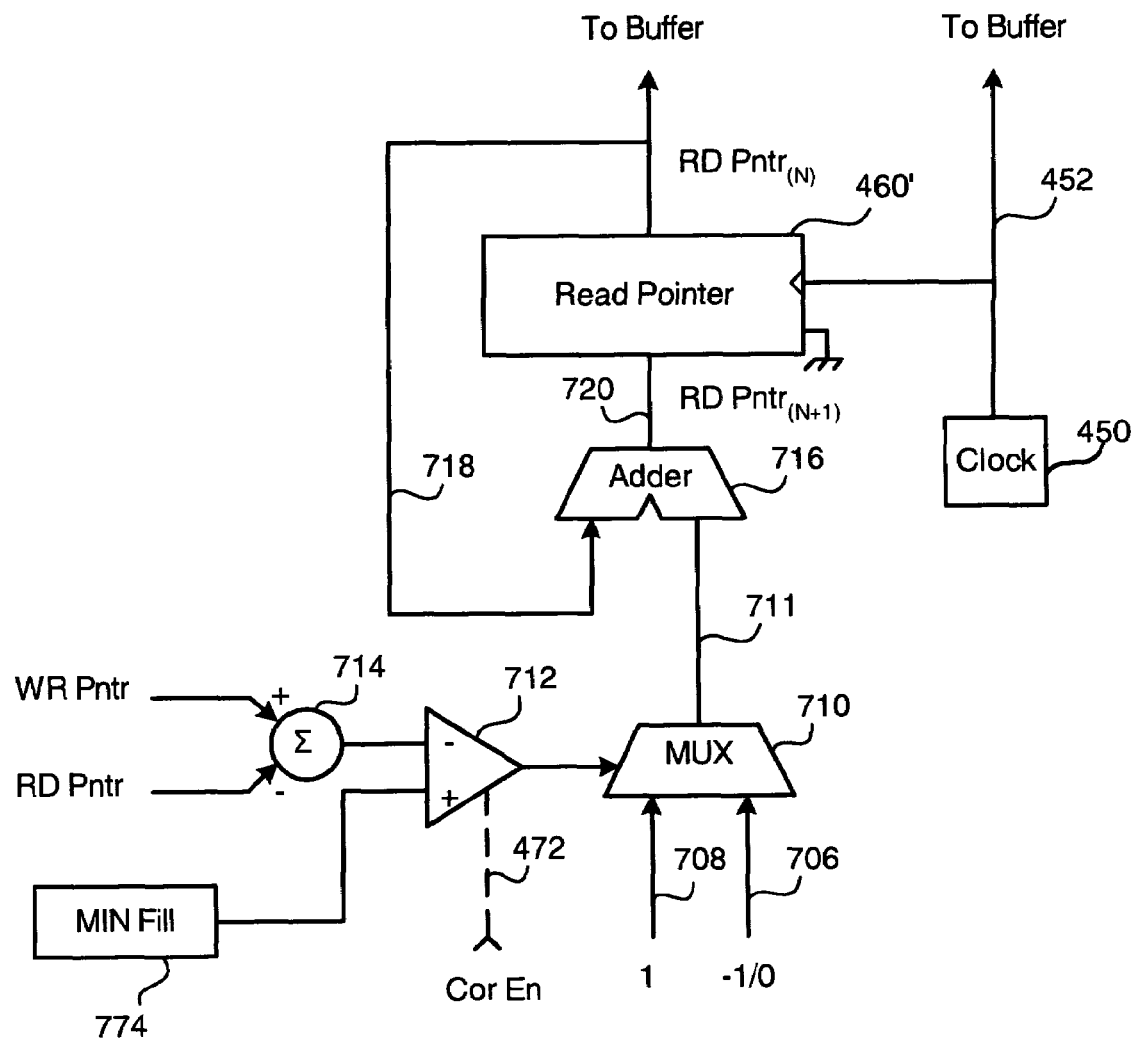
FIG. 7 is a schematic diagram showing circuitry to control the read pointer for an elastic buffer in accordance with an embodiment of the present invention.

It may be further understood, that the two different address "hold/decrement" and "increment" control circuits of, e.g., FIGS. 7 and 9 could be merged together to present the increment/decrement value at the input 711 of adder 716 dependent on whether the level of the FIFO buffer is in the nominal range, beneath the minimum level or beyond the maximum level. For example, the comparators 712 and 912 could be disposed side-by-side to drive a four-to-one multiplexer (not shown). Based on a two-bit select value generated by the comparators, the multiplexer may then select one of several alternate values as the increment/decrement value to input 711 of the adder 716.

In accordance with such embodiment, further referencing FIGS. 4A, 4B and 7-9, the first and second read pointer control circuits 470A and 470B may use independent (minimum and maximum) fill control registers 474A and 474B respectively (774 and 974, respectively, of FIGS. 7 and 9). The first read pointer control circuit may determine when to perform a decrement frequency correction. The second read pointer control circuit may determine when to perform an increment frequency correction. In this embodiment, the first control register 474A (774 of FIG. 7) of first read pointer control circuit 470A may receive a value for the fill level, which may establish when to hold or decrement the read pointer. Similarly, the second control register 474B (974 of FIG. 9) may establish when to increment the read pointer. Thus, the first control register may provide the low level threshold for the elastic buffer and the second control register may provide the upper level threshold.

In accordance with another embodiment of the present invention, elastic buffer 400 of FIGS. 4A and 4B may further comprise initialization modules 480, 485. Responsive to a power-up or reset event, the read pointer controller 400 may retrieve a pre-determined input value for the nominal fill level and may program the control register 474 with this retrieved value.

Referencing FIG. 2, in accordance with one embodiment, the value for the nominal fill level may be derived from one of a pre-programmed read only memory 202, a configurable memory cell 210, or logic of the programmable fabric of FPGA 204. Alternatively, a control input port may be enabled to allow writing of the nominal fill control register 474, which may be written dynamically during the power-up or reset sequence.

Further referencing FIGS. 4A and 4B, initialization module 485 may be responsive to a power-up or reset event to first configure write pointer 440 with an address within the address space of FIFO buffer 420. Read pointer 460 may then be configured with a value that is offset from the write pointer. The offset may be set equal to the nominal fill value of the nominal fill control register 474. Accordingly, the elastic buffer may be configured with its FIFO buffer 420 starting with an initial fill level equal to the nominal fill value.

For example, nominal fill control register 474 may be initially programmed with a value of ten. During initialization, the write pointer may receive a write address of 30. Subtracting ten from the write address, the initialization module 485 may then program read pointer 460 with a read address of 20. With this configuration, the FIFO buffer may operate with a latency of approximately 10 cycles, which may be proportionate to the amount of time in which data may remain in the FIFO buffer after being written therein.

A larger magnitude for the nominal fill of buffer 420 may allow elastic buffer 400 to accommodate larger differences between frequencies of the read and write clocks while still being able to maintain appropriate clock corrections. Similarly, the larger magnitude may allow it to accommodate greater skew between the data of separate data channels where multiple elastic buffers may be configured to operate in parallel. For applications of large frequency differences or large skew between parallel channels, a high latency and buffer size may be required. But the high latency may be excessively large for other types of data handling applications where faster throughput may be desired.

In accordance with an embodiment of the present invention, fill control register 474 may be programmable and may receive a user defined level so that the latency of the elastic buffer may be set in accordance with demands previously determined. Accordingly, a user may set a value for the control level for establishing a nominal fill level and elasticity of the elastic buffer. The value, in turn, could be based upon a pre-determined data protocol, expected packet lengths, anticipated clock differences, data skew, etc.

Figure 5:
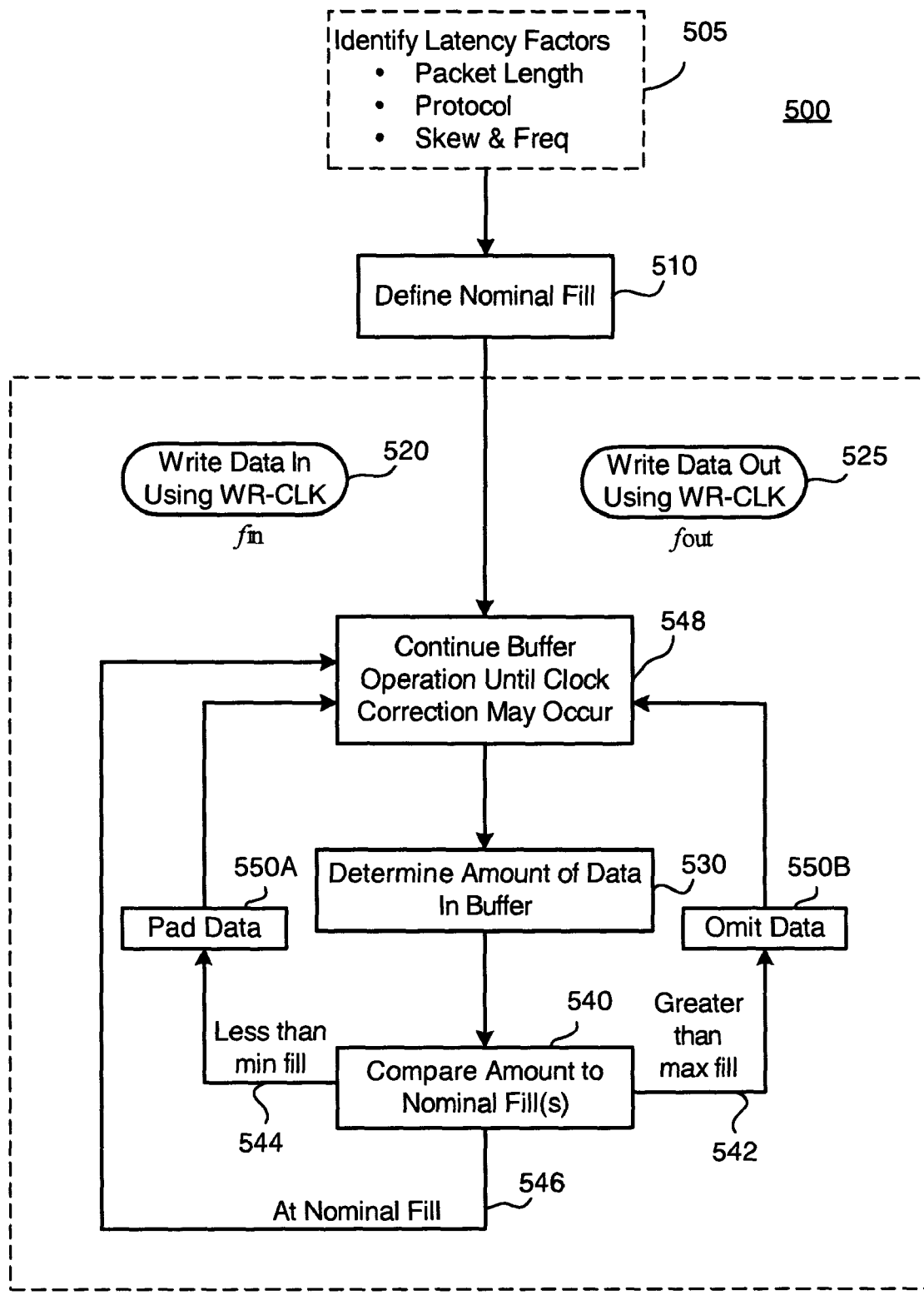
FIG. 5 is a simplified flow chart associated with a method of buffering data in accordance with an embodiment of the present invention.

In an exemplary method of operation 500, referencing FIG. 5, a data handling system may be initialized to define a nominal fill value for a variable latency elastic buffer, such as that of FIGS. 4A, 4B, 7, 8 and 9. The value for the nominal fill may be defined (step 510) by obtaining programmable data from a programmable fabric. In further embodiments, it may be obtained from PROM 202, or a sequence of memory cells 210 of the programmable fabric, or a dynamic control port logically structured by the programmable fabric of FIG. 2.

In operation, further referencing FIG. 5, the elastic buffer may write (step 520) data into the FIFO buffer using a write clock of a first frequency ($f_{in}$). Data of the FIFO buffer may then be read out 525 using a read clock of a second frequency ($f_{out}$). While the FIFO buffer is in operation, a controller may monitor the amount of data in the buffer. This normal operation of the buffer continues (step 548) until a clock correction may occur, for example when correction enable signal (such as signal 472 in FIGS. 4A and 4B) is asserted. As stated earlier, a correction enable signal may be asserted, for example, upon determining the presence of an idle or a gap sequence between data packets of the buffer Then, in accordance with one embodiment, the amount of data may be determined (step 530) by subtracting the address of the read pointer from the address of the write pointer. This amount determined may then be compared (step 540) to a previously defined control level or levels. If the amount is determined to be greater (branch 542) than the control level (e.g., a maximum fill value), then control may transition to a data omission clock correction (step 550B). Should the comparison (step 540) determine the amount to be less (branch 544) than the control level (e.g., a minimum fill value), then control may transition to clock correction (step 550A) for padding data. After executing clock correction (by either padding or omitting data, as in steps 550A and 550B, respectively), the buffer returns to normal operation (step 548), and normal operation continues until the next opportunity to execute clock corrections.

Continuing with further reference to FIG. 5, if the comparison at step 540 determines that the amount of data in the buffer is within a nominal fill level (e.g., between the minimum and maximum fill values), then control may transition along path 546 and may return (step 548) to normal buffer operation.

In accordance with a further embodiment of the present invention, referencing FIGS. 4A and 4B, the read control circuitry 470A and 470B may further comprise provision 473 for receiving a threshold value, which may also affect when to hold/decrement or advance the address of the read pointer. For example, the amount of data in the buffer may be determined and compared to a nominal fill level of the nominal control register 474. If the amount exceeds the nominal fill level by at least the threshold level 473, then the read pointer control circuitry may increment the address of the read pointer for data omission. Alternatively, should the amount be less than the nominal fill by at least the threshold, then the read pointer control circuitry may hold or decrement the read address for padding data into the output. With the addition of threshold input 473, a hysteresis effect may be provided for the plus/minus clock correction events. For example, assuming a nominal fill level of 10, and a threshold value of 2, the pointer increment would occur upon determining that the amount of data in the buffer is 12 or greater. Additionally, the pointer increment could restore the level to the nominal fill value. Conversely, a pointer hold or decrement would occur when determining that the amount of data in the buffer is 8 or less.

In accordance with one embodiment of the present invention, the threshold may be obtained from a threshold control register. Additionally, and in accordance with a further embodiment, during initialization, an initialization module may program the threshold control register with a value based upon the nominal fill level. For example, the threshold may be assigned a value equal to ten percent of the nominal fill. Accordingly, if the nominal fill level should be programmed with a value of ten, then the threshold control register would be configured with a value of one.

In accordance with a further embodiment of the present invention, the upper significant bits of the nominal fill control register may be used to establish the threshold level at the threshold input 473. For example, a nominal fill level of eight may establish a threshold level of four (by stripping the least significant bit). Or alternatively, a nominal fill level of 16 may establish a threshold level of four (should the lower two significant bits of the nominal level be stripped for establishing the threshold).

In yet a further embodiment of the present invention, the threshold value may be selected as one of a plurality of pre-determined levels dependent upon the magnitude of the nominal fill. Accordingly, the magnitude of the nominal fill level may be used to drive a multiplexer to select one of the plurality of different threshold levels. Finally, in further embodiments, the threshold level may be obtained directly from a pre-programmed read only memory (PROM) 202, such as that of FIG. 2. Or, the threshold value may be obtained via a plurality of configured memory cells 210 of programmable fabric 204, or from a control input port configured by the programmable fabric to allow writing of the threshold control register.

In yet a further embodiment of the present invention, an initialization routine, e.g., of a processor, may determine a nominal fill level for the nominal control register 474 by one of a variety of performance parameters of the elastic buffer. In one embodiment, an initialization algorithm may determine (step 505 of FIG. 5) a desired latency and calculate a nominal fill level based on the identified latency. In a further embodiment, the difference between an input frequency and an output frequency may be used to establish the value for the nominal fill value. Likewise, if a data transmission protocol specifies large data packets or a large number of data blocks between gap or idle periods, then the elastic buffer may need to be configured for a larger size to assure that a gap or idle sequence may be obtained for allowing clock corrections. Accordingly, the protocol type and/or the length of data blocks or packets may similarly be used to affect the calculation of the nominal fill level.

Further, an anticipated skew may also impact the amount of buffering required within the variable latency elastic buffer. This performance parameter might also be incorporated by the initialization module to establish the nominal fill level.

It will be understood that any one of the above performance parameters alone, or in combination, may be used as the basis by which to calculate the nominal fill level during an initialization.

Returning with reference to FIG. 1, a communication system 100 may comprise a plurality of transceiver circuits (e.g., transceivers 102, 103, 104) working in parallel so as to increase the effective speed of data interfacing. For example, the data words of a transmitter may be spit into a plurality of bytes, and each byte may be propagated on a separate communication channel. The separate bytes may then be received in parallel by separate transceivers 102, 103, 104 of the communication system 100. However, it may be noted that the delay through one communication channel may differ from that of others. Accordingly, because one of the data words of the longer channel may not be properly aligned when received at the receiver, it may be necessary for the separate words to be re-aligned. The received bytes may then be arranged in proper sequential order at a receiver and configured to recover the original words. This re-alignment may be known as "channel bonding."

Figure 6:
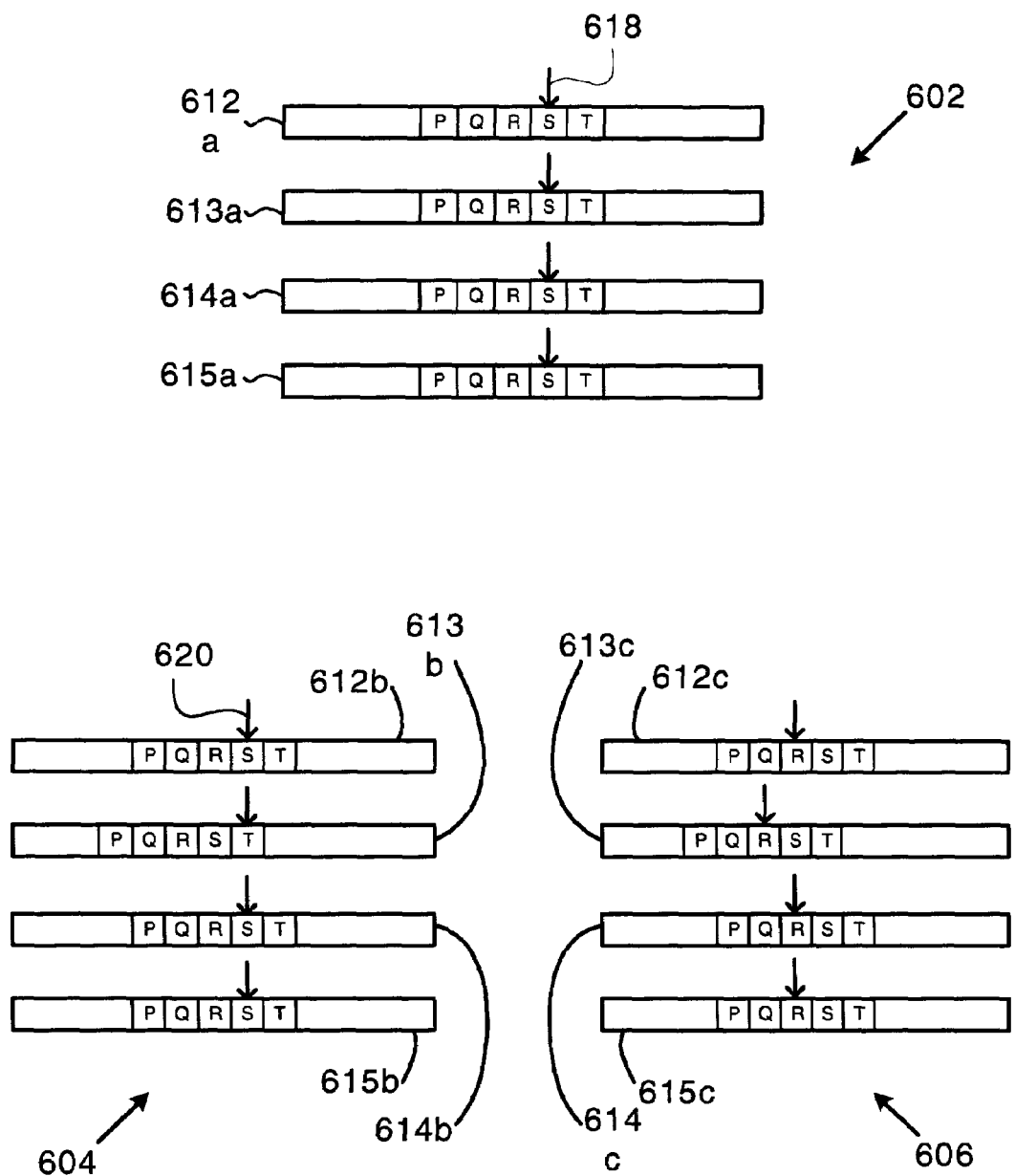
FIG. 6 is a simplified diagram for illustrating plural channels and channel bonding.

Referencing FIG. 6, four parallel data sequences of output buffers 612a, 613a, 614a, 615a of a transmitter 602 may be configured to send out respective bytes of a four-byte word. For example, the transmitter may send out a four-byte word that may contain "SSSS". The first byte "S" may be sent out by a first buffer 612a, and the second byte "S" sent out by a second buffer 613a, and the third and fourth bytes sent by respective buffers 614a and 615a. When sent, each of the bytes may be in synchronous alignment when first applied to the channels and relative to the other channels. This is represented pictorially with the relative timing of sampling read clock 618.

At a receiver, received data sequences of buffers 612b, 613b, 614b, 615b of the four separate channels may not be aligned relative to the sequential arrangements of each other. For example, the receiver sampling clock 620 of the buffers may capture data of the second buffer 613b that is not aligned relative to the others. This misalignment may result from a variation of transmission delays, especially if the data streams may be routed through repeaters. In this particular example, further referencing FIG. 6, the received words in buffers 604 may show a structure of "STSS", which is not the same as that which was transmitted.

Through proper realignment, or channel bonding, the read address of the various buffer channels 612c, 613c, 614c, 615c may be properly interrelated by their read pointers and positioned to the desired buffer locations so as to capture the correct data bytes with the read clock.

In a particular embodiment, a special byte sequence may be positioned into the data stream of the various buffers. For example, "P" bytes may be designated as a special character for purposes of re-alignment. Accordingly, each receiving transceiver may recognize the "P character" and remember its location within the buffer. One of the transceivers may be designated as a master for instructing all of the other slave transceivers to re-align their channel for bonding to the designated bonding character "P" (or to some location relative to the channel bonding character). After this re-alignment operation, the words may be properly aligned: for example, RRRR, SSSS, TTTT, etc.

Figure 10:
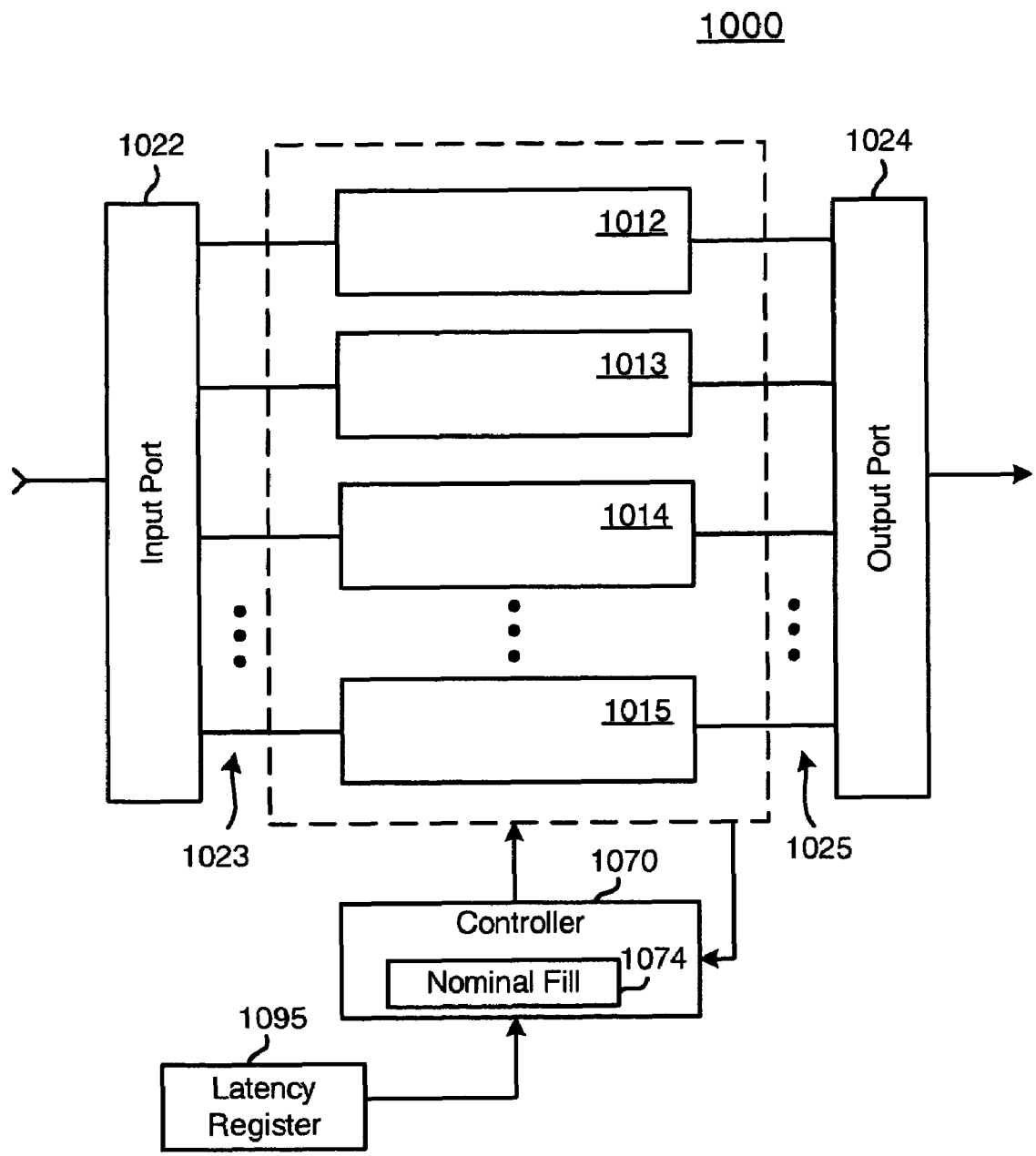
FIG. 10 is a schematic diagram showing a channel alignment circuit in accordance with an embodiment of the present invention.

In accordance with a further embodiment of the present invention, with reference to FIG. 10, a channel alignment circuit 1000 may comprise input port 1022 of multi-block width 1023, and output port 1024 of multi-block width 1025. A plurality of elastic buffers 1012, 1013, 1014, 1015 may buffer and synchronize data of the multiple channels such that the data received may be presented at the outputs of the buffers in synchronous, ordered relationship relative to that of the other buffers. Each of the buffers may include correction logic, as described above, to perform clock correction. One of the buffers may be designated a master and may include a controller 1070. The controller may comprise a control register 1074 to receive a threshold and/or nominal fill level or it may receive min/max values as a control value. During clock correction, logic may be operative to pad or omit data from at least one of the buffers dependent upon the master determining that the amount of data contained therein differs from, e.g., a nominal fill value of the control register by an amount exceeding the threshold value.

Again, in a particular embodiment, a comparator may determine when the amount of data in the buffer differs from the nominal fill level. Further, the value for the nominal fill may be based on a latency value presented by latency register 1095. Correction logic may be enabled to pad data for output responsive to determining an amount of data in a buffer to be less than the nominal fill value; or it may be enabled to omit data for output responsive to determining that the amount of the date in the buffer is greater than the nominal fill value.

In the above description, correction processes and embodiments have been disclosed that may provide adjustments to a read pointer. It will be understood that alternative embodiments may adjust the write pointer. For example, a query circuit may determine the presence of a gap between packets, a coding region, etc. A control circuit for the write pointer may then halt advancement of, or decrement, the write pointer, based upon the signal from the query circuit and determinations of the fill level of the buffer. For this alternative embodiment, when the level of the buffer exceeds the nominal fill, or other threshold, the write buffer control circuit may wait for enablement from the query circuit and then act to re-write previously written location(s).

While certain exemplary features of the embodiments of the invention have been illustrated and described herein, many modifications, substitutions, changes and equivalents may now occur to those skilled in the art. It is, therefore, to be understood that the appended claims are intended to cover all such embodiments and changes as fall within the spirit of the invention.

The invention claimed is:

1. A buffer circuit comprising:
   a plurality of memory locations to hold data;
   a read pointer to point a read address of the plurality of memory locations from which to read output data;
   a write pointer to point a write address of the plurality of memory locations in which to write input data;
   the read pointer and the write pointer operable responsive to a read clock signal and a write clock signal, respectively, to sequence the read address and the write address, respectively, across an address space of the plurality of memory locations;
   a control register to store a nominal level for the buffer circuit;
   the control register being programmable for receiving the nominal level for setting latency of the read pointer;
   the latency of the read pointer being variable responsive to a fill level of the plurality of memory locations relative to the nominal level; and
   a controller to affect operation of the read pointer dependent on the write address of the write pointer, the read address of the read pointer, and the nominal level,
   wherein the controller is operable to:
   determine an amount of data in the buffer circuit based on a difference between the write address and the read address,
   cause the read pointer to increase the read address in advance of the read clock signal responsive to the amount of data being greater than the nominal level, and
   wherein the controller is configured to adjust the read pointer independently of the read clock signal.

2. The buffer circuit of claim 1, in which the controller is further operable to hold the read address of the read pointer when the amount of data is determined to be less than the nominal level.

3. The buffer circuit of claim 1, in which the controller is further operable to decrement the read address in advance of the read clock signal when the amount of data is determined to be less than the nominal level.

4. The buffer circuit of claim 1, further comprising initialization circuitry to:
   configure the write pointer with a predetermined start address for the write address; and
   configure the read pointer with a beginning value based on the predetermined start address for the write address and the nominal level.

5. The buffer circuit of claim 4, in which the beginning address for the read pointer is an address offset from the starting write address, and the address offset is equal to the nominal level.

* * * * *